Nov. 2, 1965   R. E. ADDY   3,215,463
YARD AND GARDEN TOOL
Filed July 29, 1963
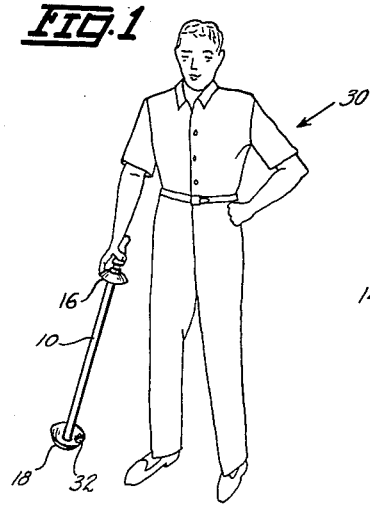
FIG. 1
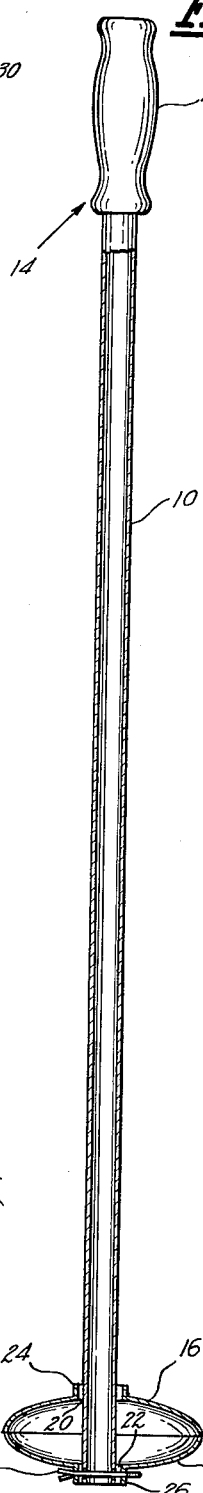
FIG. 2
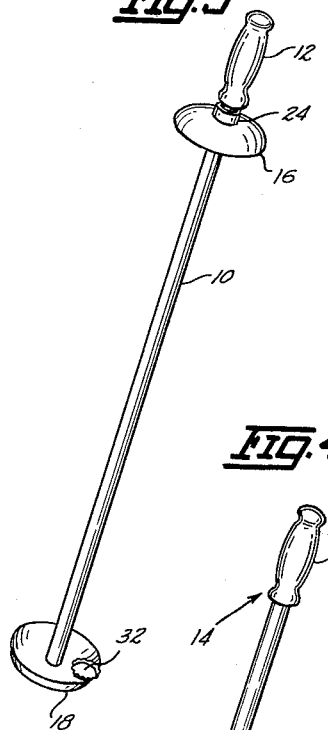
FIG. 3
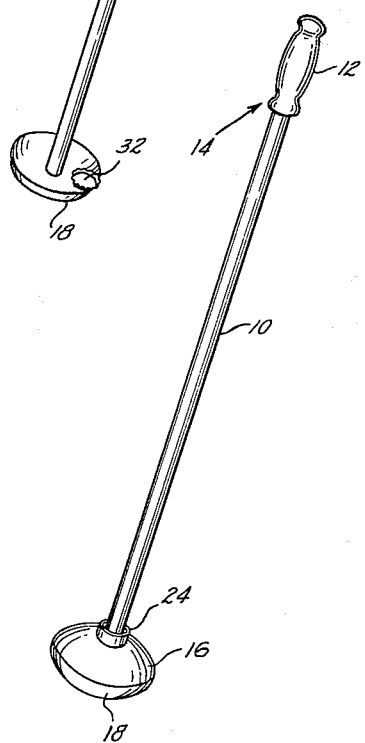
FIG. 4
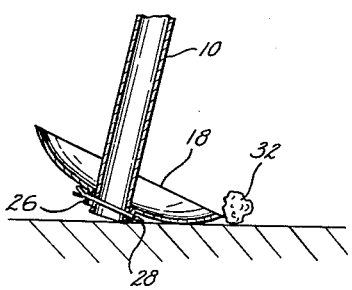
FIG. 5
INVENTOR.
RALPH E. ADDY
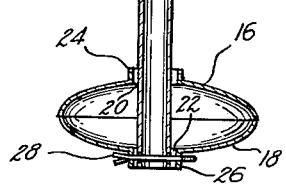
ATTORNEY.

United States Patent Office 3,215,463
Patented Nov. 2, 1965

3,215,463
YARD AND GARDEN TOOL
Ralph E. Addy, 620 42nd St., Des Moines, Iowa
Filed July 29, 1963, Ser. No. 298,335
4 Claims. (Cl. 294—19)

This invention relates to a novel yard and garden tool and one of the important objects contemplated herein is the provision of such a tool adapted particularly for picking up foreign objects in a yard or garden such as sticks, stones, small branches, bottle caps, cigarette butts, paper and many similar items.

Another object of this invention is to provide a tool of the above class in which a clam shell type gripping means is utilized so that this tool can be effective in picking up items of metal, wood or the like that cannot be satisfactorily handled by the pointed stick tool which is in common use for gathering debris from yards and gardens.

A further object is to provide such a tool as characterized which includes a movable gripping element easily operable by one hand of a user so that this tool can be efficiently and effectively used either from a standing or walking position or from a sitting position such as may be the case when operating a riding power lawn mower.

Other objects herein include the provision of a most novel and useful yard and garden tool that is simple in structure, durable in construction, economical to manufacture and exceedingly efficient for its intended purpose.

To attain these objects and such further objects as may appear herein, or be hereinafter pointed out, reference is made to the accompanying drawings forming a part hereof, in which:

FIG. 1 is a perspective view of this tool being used by an operator,

FIG. 2 is an enlarged longitudinal sectional view of this new tool,

FIG. 3 is a perspective view of this tool showing the position of the parts thereof for initially engaging an object to be picked up, FIG. 4 is a view similar to FIG. 3 but showing the parts in securing position after an object has been engaged, and FIG. 5 is an enlarged fragmentary sectional view of the ground engaging portion of this tool in position for engaging an object.

Referring to the drawings, an elongated shank 10 is preferably in the form of a suitable rigid tubular member for minimum weight but may be in the form of bar or rod material if desired, and preferably includes a hand grip 12 of rubber or the like secured at the upper end portion 14.

Mounted on shank 10 are two like complementary material engaging members 16 and 18 which are preferably disc-shaped and also are preferably dished as shown in FIG. 2 so that in their cooperative relationship as will be described, they define a clamshell-like assembly with member 16 being the upper unit and member 18 being the lower unit.

The members 16 and 18 are each provided with the respective axial openings 20 and 22 which are slightly oversized relative to the diameter of shank 10 and include the respective concentric annular collars or bearing members 24 and 26 that project axially outwardly from the respective convex outer surfaces of members 16 and 18. The lower clamshell unit portion 18 is anchored to shank 10 against longitudinal movement thereon by means of a cotter pin 28 extending transversely through collar 26 and the lower end portion of shank 10 as seen in FIGS. 2 and 5. The upper unit 16 is freely slidable on shank 10 intermediate unit 18 and the grip 12 which serve as respective stops therefor. Each unit 16 and 18, because of the size of the respective openings 20 and 22, are afforded a slight amount of play relative to shank 10 so that in their position shown in FIG. 2, they are self-aligning in complementary juxtaposition.

With this new tool constructed and arranged as described, it can be used by an operator 30 either in a standing position as represented in FIG. 1 or in a sitting position (not shown) such as when riding a power mower, for example. For use of this tool, grip or handle 12 is grasped in one hand and the upper unit 16 may be either manually pulled to a position adjacent grip 12, or preferably, shank 10 is merely elevated so that unit 18 is higher than grip 12 and unit 16 will then slide by gravity toward grip 12 which serves as a stop therefor. With unit 16 thus adjacent grip 12, it is temporarily held or restrained merely by the operator engaging it with one of his fingers.

At this point, this tool is used similarly to a rake against any object to be picked up or retrieved such as sticks, small stones or rocks, paper debris, small branches, bottle caps, cigarette butts and the like designated generally by the numeral 32, and when a portion of the perimeter of the lower unit 18 has been engaged with any such object 32, the upper unit 16 is released to fall by gravity into registering position with unit 18 whereby object 32 is either secured between the edges of units 16 and 18 or, in the case of small objects particularly, is trapped within the interior of the clamshell structure thus formed.

The position of units 16 and 18 will remain as shown in FIG. 2 as long as shank 10 is not elevated above a horizontal plane and thus the trapped object 32 can be transported to any desired point of deposit where a sufficient elevation of shank 10 will permit unit 16 to free slide away from unit 18 and allow object 32 to fall out. This may, of course, be done over a container, into a refuse pile or into the other hand of the operator.

This tool as described has proved to be most useful in recovering foreign objects in flower gardens and around bushes, as well as on open stretches of ground. It is also particularly useful in removing objects from the path of a riding mower where the operator can effect such removal without leaving his seat. Since the object 32 is embraced rather than pierced as some tools of this type require, it will be appreciated that the character of the object 32, such as paper, metal, wood or stone, is immaterial to the effectiveness of this new tool.

By loosely mounting units 16 and 18 on shank 10 as described, they are self-aligning when in contact with each other (FIG. 2) and thus assures a more secure grip on or enclosure for any object 32. However, unit 18 may be securely affixed to shank 10, if desired, but experience has shown that when this is done, such unit tends to become bent or sprung so as not to register with unit 16 as satisfactorily as when loosely affixed although it will operate as described, albeit not as efficiently.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. A yard and garden tool comprising:
an elongated shank having a top and bottom end,
a first material engaging member wobbly secured at the bottom end of said shank,
a second material engaging member freely slidably arranged on said shank above said first material engaging member, the top end of said shank adapted to be gripped by the hand of an operator, said second material engaging member being slidable on said shank toward the top end thereof either manually or by gravity by elevating the bottom end of said shank and being temporarily restrained at the top end of said shank only by the hand of an operator, said first material engaging member adapted for use similarly to a rake for engaging an object, with an object so engaged, said second material engaging member being released to slide by gravity on said shank into abutting contact with said first material engaging member so as to secure said object therebetween for the purpose of removal to a point of deposit, and said material engaging members being separable so as to release a secured object by elevating said shank so that said second material engaging member slides on said shank.

2. A yard and garden tool comprising:

an elongated shank having a top and bottom end, a first disc member concentrically but wobbly attached to the bottom end of said shank, a second disc member slidably concentrically arranged on said shank above said first disc member, a stop member near the top end of said shank to limit the movement of said second disc in one direction, said second disc member capable of being restrained only by manual engagement near the top end of said shank, said first disc member being maneuverable like a rake so that its perimeter will engage an object, and with the first disc member at a lower plane than the second disc member and engaged with an object, the manual release of said second disc member permits it to slide by gravity on said shank into juxtaposition with said first disc member so as to secure said object therebetween.

3. A device as defined in claim 2 in which:

said disc members are of like diameter, and said second disc member is loosely arranged on said shank so that said disc members are self-aligning in complementary relationship when said second disc member moves into juxtaposition with said first disc member.

4. A yard and garden tool comprising:

an elongated shank having a top and bottom end, a first disc member concentrically but wobbly attached to the bottom end of said shank, a second disc member slidably and wobbly concentrically ararnged on said shank above said first disc member, a hand grip member at the top end of said shank and serving also to limit the movement of said second disc in one direction, said second disc member capable of being restrained only by manual engagement near the top end of said shank, said first disc member being maneuverable like a rake to engage an object, and with the first disc member at a lower plane than the second disc member and engaged with an object, the manual release of said second disc member permits it to slide by gravity on said shank into juxtaposition with said first disc member so as to secure said object therebetween.

References Cited by the Examiner

UNITED STATES PATENTS 238,488   3/81   Conradt _____ 220—41

FOREIGN PATENTS 3,294   1872   Great Britain.

SAMUEL F. COLEMAN, *Primary Examiner.*

ERNEST A. FALLER, *Examiner.*